(12) United States Patent
Dean, Jr. et al.

(10) Patent No.: US 6,412,988 B1
(45) Date of Patent: Jul. 2, 2002

(54) FERRULE AND FIBER OPTIC CONNECTOR HOUSING HAVING ENLARGED SHOULDERS

(75) Inventors: David L. Dean, Jr.; James P. Luther; Joel C. Rosson; Thomas Theuerkorn, all of Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/476,753

(22) Filed: Dec. 30, 1999

(51) Int. Cl.[7] .................................................. G02B 6/38
(52) U.S. Cl. ............................ 385/78; 385/79; 385/76; 385/77
(58) Field of Search ............................. 385/78, 79, 76, 385/77, 81–83, 86, 87, 59, 60, 62, 63, 64, 65

(56) References Cited

U.S. PATENT DOCUMENTS

| | | | |
|---|---|---|---|
| 5,799,122 A | * | 8/1998 | Jeong et al. ................... 385/59 |
| 5,896,479 A | * | 4/1999 | Vladic .......................... 385/59 |
| 6,085,003 A | * | 7/2000 | Knight ......................... 385/59 |
| 6,149,313 A | * | 11/2000 | Giebel et al. ................. 385/59 |

* cited by examiner

Primary Examiner—Mohammad Sikder

(57) ABSTRACT

A ferrule is provided that defines a shoulder having curved corners. In this regard, the ferrule includes a lengthwise extending shaft and an enlarged rear portion proximate the shaft. The rear portion is larger in lateral cross-section than the shaft to thereby define a shoulder. In addition, that portion of the shaft proximate the enlarged rear portion includes curved corners such that the shoulder has corresponding curved inner corners. A fiber optic connector housing is also provided that defines an inwardly projecting shoulder having curved corners. The fiber optic connector housing includes a forward segment defining a lengthwise extending passage and a rearward segment also defining a lengthwise extending passage. The lengthwise extending passage defined by the rearward segment is larger in lateral cross-section than the lengthwise extending passage defined by the forward segment such that a shoulder is defined at the intersection of the forward and rearward segments. In addition, that portion of the forward segment proximate the rearward segment defines a section of the lengthwise extending passage having curved corners such that the resulting shoulder also has curved corners. By including shoulders having curved corners, the fiber optic connector of the present invention allows the ferrule to float within the internal cavity defined by the connector housing without becoming dislodged and assuming a cocked position within the internal cavity.

23 Claims, 6 Drawing Sheets

FERRULE AND FIBER OPTIC CONNECTOR HOUSING HAVING ENLARGED SHOULDERS

FIELD OF THE INVENTION

The present invention relates generally to a fiber optic connector and, more particularly, to a ferrule and a fiber optic connector housing having enlarged shoulders to provide improved registration therebetween.

BACKGROUND OF THE INVENTION

Fiber optic connectors include a connector housing defining a lengthwise extending internal cavity and a ferrule disposed at least partially within the internal cavity defined by the connector housing. In addition to the ferrule and the connector housing, a fiber optic connector typically includes a crimp body connected to a rear portion of the connector housing and a spring disposed between the crimp body and the rear surface of the ferrule for urging the ferrule forwardly in the internal cavity defined by the connector housing. A fiber optic connector also typically includes a crimp band for cooperating with the crimp body to engage one or more strength members of an optical cable to securely attach the fiber optic connector to the fiber optic cable, as well as a connector boot for providing strain relief for the optical fibers. In addition, a fiber optic connector can include one or more optional components, such as a pin keeper, a spring centering element, a lead-in tube, and a divider as known to those skilled in the art.

Most ferrules, including both single fiber ferrules and multifiber ferrules, include a ferrule body having a lengthwise extending shaft and an enlarged rear portion. Since the rear portion is larger in lateral cross-section than the shaft, conventional ferrules define a shoulder that extends circumferentially about the ferrule body.

One common type of multifiber connector is an MTP connector such as described by U.S. Pat. No. 5,214,730 to Shinji Nagasawa et al. that issued on May 25, 1993, and is assigned to Nippon Telegraph and Telephone Corporation of Tokyo, Japan. A conventional MTP connector includes an MT multifiber ferrule having a generally rectangular shape in lateral cross-section. In this regard, an MT ferrule typically has a shaft that has a rectangular cross-sectional shape and an enlarged rear portion that also has a rectangular cross-sectional shape. Since the rear portion of an MT ferrule is larger than the shaft, the resulting shoulder also has a rectangular shape, and extends circumferentially about the shaft.

Similarly, the connector housings of most fiber optic connectors, including MTP connectors, also define an inwardly projecting shoulder. In this regard, a conventional connector housing generally defines an internal cavity having forward and rearward segments in which the rearward segment is larger in lateral cross-section than the forward segment. As such, conventional connector housings also define a shoulder at the intersection of the forward and rearward segments.

Since the connector housing of an MTP connector is specifically designed to receive an MT ferrule, the internal cavity defined by the connector housing generally has a rectangular shape in lateral cross-section in order to match the shape of the MT ferrule. As such, the shoulder defined by the connector housing between the forward and rearward segments of the internal cavity also generally has a rectangular shape. In order to assemble an MTP connector, the ferrule is inserted through the rear end of the connector housing and into its internal cavity. The ferrule is then advanced forwardly through the internal cavity until its shoulder contacts and engages the shoulder of the connector housing. Once the two shoulders are engaged, the shaft of the ferrule extends into the forward segment of the internal cavity, while the enlarged rear portion of the ferrule is retained within the rearward segment of the internal cavity.

While it is important for the respective shoulders of the ferrule and connector housing to engage to limit the amount by which the ferrule can protrude beyond the connector housing, fiber optic connectors are also designed such that the ferrule is capable of floating within the connector housing. By floating, the ferrule can move somewhat from side to side relative to the connector housing in order to facilitate alignment when the fiber optic connector is mated, such as with another fiber optic connector. As such, the forward segment of the housing's internal cavity generally has a slightly larger cross-sectional area than the shaft of the ferrule. Likewise, the rearward segment of the internal cavity also generally has a larger cross-sectional area than the rear portion of the ferrule.

As a result of its rectangular shape in lateral cross-section, an MT ferrule generally has a pair of opposed major sides and a pair of opposed minor sides, with the major sides being broader or wider than the minor sides. In order to maximize the float afforded to a ferrule within the connector housing of an MTP connector, some connector housings are designed such that the inwardly projecting shoulder only engages the shoulder defined by the ferrule along the opposed minor sides and does not engage the shoulder defined by the ferrule along the major sides.

In order to further maximize the float afforded to the ferrule, the forward segment of the internal cavity of an MTP connector is typically sized as large as possible relative to the MT ferrule. As shown in FIG. 1, the difference between the width f of the opening defined by the shoulder 10 of the connector housing 12 and the width w of the shaft 14 of the ferrule 16 is typically equal to about one-half of the difference in the width s of the enlarged rear portion 18 of the ferrule and the width w of the shaft portion of the ferrule. As such, the opposed minor sides of the shoulder 16a defined by the ferrule are both generally engaged by the shoulder of the connector housing. In instances in which the forward segment of the internal cavity is chamfered such that most portions of the forward segment are larger than the opening defined by the shoulder between the forward and rearward segments, the shoulder of the ferrule can become dislodged from the inwardly protruding shoulder of the connector housing. In this instance, the ferrule would assume a cocked position as shown in FIG. 2 so the ferrule is no longer aligned with the connector housing. As a result of the bias force introduced by the spring that urges the ferrule forward, the ferrule will typically remain in the cocked position, thereby preventing mating of the optical fibers.

SUMMARY OF THE INVENTION

A ferrule is therefore provided according to one embodiment of the invention that defines a shoulder having curved corners. In addition, a fiber optic connector housing is provided according to another embodiment of the present invention that defines an inwardly projecting shoulder having curved corners. By including shoulders having curved corners, the fiber optic connector of the present invention allows the ferrule to float within the internal cavity defined by the connector housing without becoming dislodged and assuming a cocked position within the internal cavity. As such, the fiber optic connector of the present invention maintains the ferrule in an aligned position relative to the connector housing such that the optical fibers upon which the ferrule is mounted can be optically interconnected with other optical fibers.

According to one embodiment, a ferrule is provided that includes a lengthwise extending shaft and an enlarged rear portion proximate the shaft. The rear portion is larger in lateral cross-section than the shaft to thereby define a shoulder. While that portion of the shaft proximate the enlarged rear portion includes curved corners such that the shoulder has corresponding curved inner corners, that portion of the shaft proximate the enlarged rear portion is not cylindrical but, instead, includes at least one linear edge extending between a pair of the curved corners. In this regard, both the lengthwise extending shaft and the enlarged rear portion preferably define a substantially rectangular shape such that the resulting shoulder also has a substantially rectangular shape, albeit with curved inner corners.

In one advantageous embodiment, the curved corners are semicircular in shape. In this embodiment, the semicircular corners can define an interior angle of 90° and a radius of about 1 millimeter. Alternatively, the curved corners can be elliptical in shape. In one embodiment, the enlarged rear portion also includes curved corners. According to this embodiment, the curved corners of both the shaft and the enlarged rear portion are semicircular in shape. In this regard, the semicircular corners of the enlarged rear portion preferably define a smaller radius than the semicircular corners of the shaft.

According to another embodiment of the present invention, a fiber optic connector housing is provided that includes a forward segment defining a lengthwise extending passage and a rearward segment also defining a lengthwise extending passage. The lengthwise extending passages defined by the forward and rearward segments are in communication. However, the lengthwise extending passage defined by the rearward segment is larger in lateral cross-section than the lengthwise extending passage defined by the forward segment. As such, a shoulder is defined at the intersection of the forward and rearward segments. According to this embodiment, that portion of the forward segment proximate the rearward segment defines a section of the lengthwise extending passage having curved corners and at least one linear edge extending between the pair of curved corners. In this regard, the lengthwise extending passage defined by the forward segment preferably has a substantially rectangular shape in lateral cross-section.

According to one embodiment, the curved corners of that portion of the forward segment proximate the rearward segment are semicircular in shape. In this regard, the semicircular corners can define an interior angle of 90° and have a radius between about 0.5 millimeters and 0.7 millimeters. Alternatively, the corners can be elliptical in shape.

According to either embodiment, the ferrule will be permitted to float somewhat within the internal cavity defined by the connector housing. By designing the ferrule and/or the connector housing such that at least one shoulder has curved corners, the shoulders of the ferrule and the connector housing remain in contact and in engagement even as the ferrule floats within the internal cavity defined by the connector housing. As such, the ferrule remains in an aligned position within the connector housing and is prevented from becoming cocked within the internal cavity as would occasionally occur with conventional fiber optic connectors in which the shoulder of the ferrule would slip off of the inwardly projecting shoulder of the connector housing.

DETAILED DESCRIPTION OF THE PREFERRED EMBODIMENT

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2:
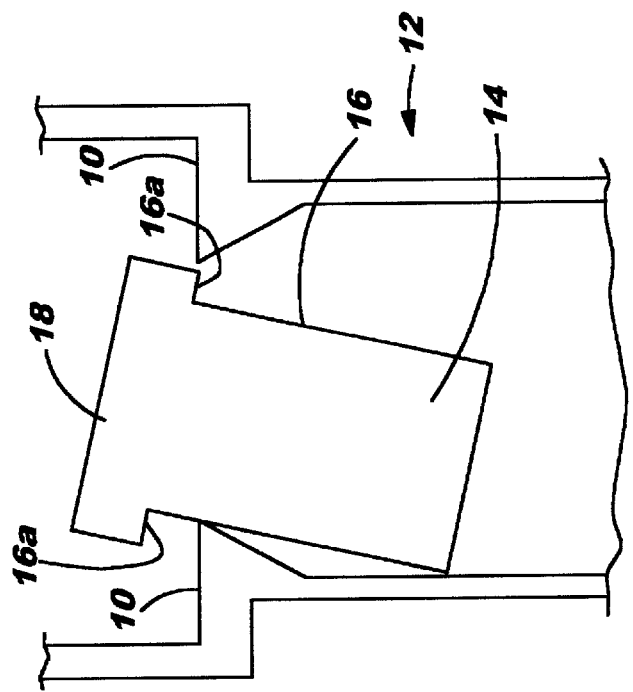
FIGS. 1 and 2 are schematic views of a conventional fiber optic connector housing and a conventional ferrule illustrating the engagement of the shoulders of the ferrule and the connector housing in FIG. 1 and the manner in which the ferrule can become cocked or misaligned within the internal cavity defined by the connector housing once the shoulders of the ferrule and the connector housing are dislodged in FIG. 2.
Figure 1:
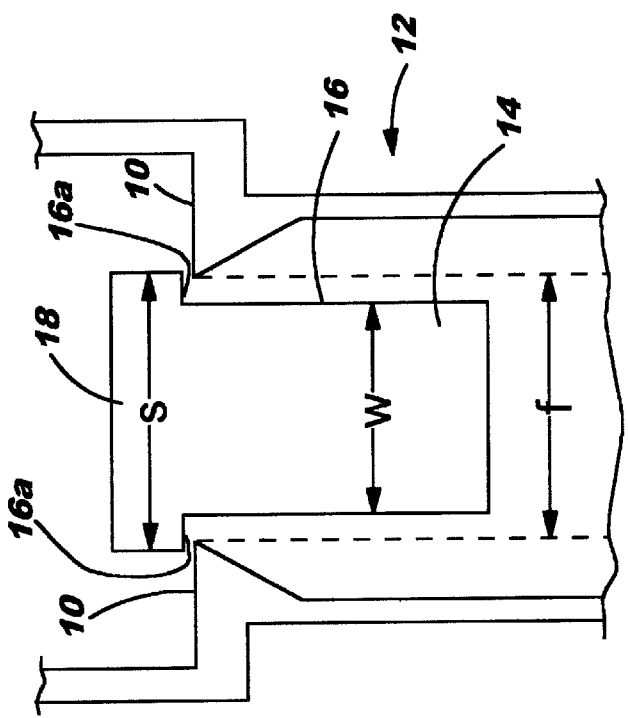
Figure 3:
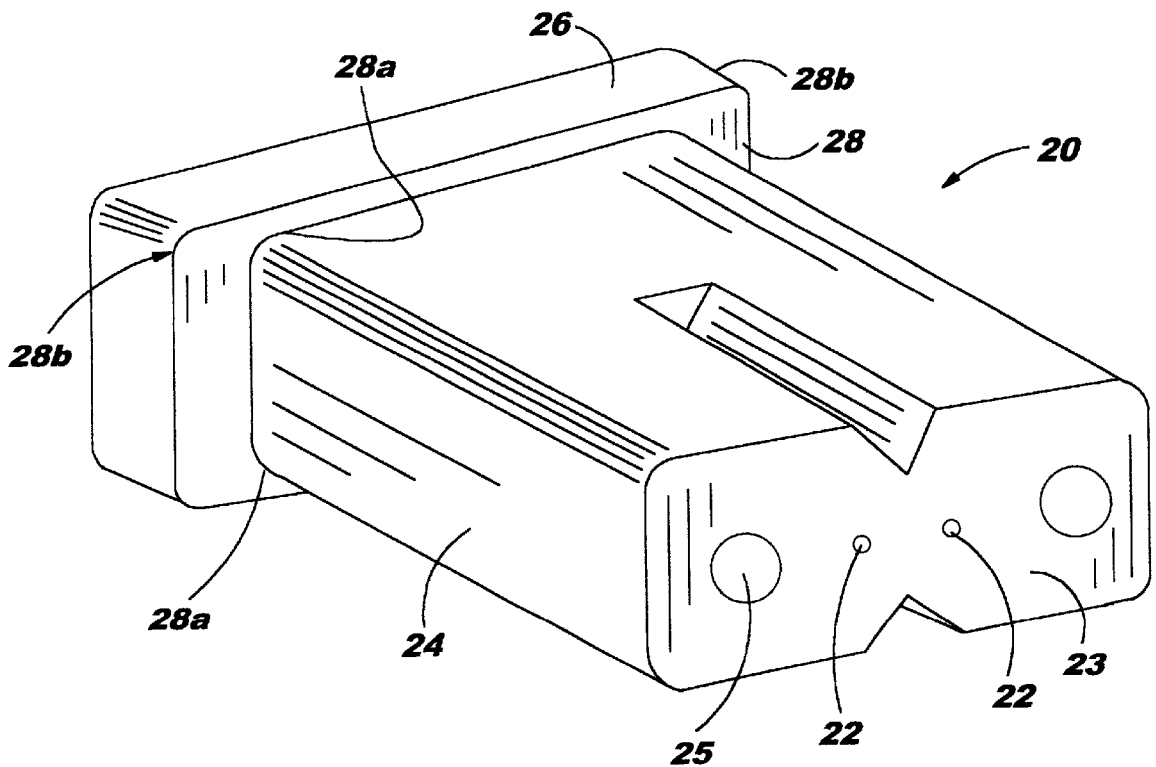
FIG. 3 is a perspective view of a ferrule according to one embodiment of the present invention.

Referring now to FIG. 3, a ferrule 20 according to one advantageous embodiment of the present invention is depicted. While a multifiber ferrule defining a plurality of optical fiber bores 22 extending lengthwise therethrough is shown, the ferrule can also have more or fewer bores, including being a single fiber ferrule that defines one optical fiber bore extending lengthwise therethrough without departing from the spirit and scope of the present invention. The ferrule includes a lengthwise extending shaft 24 and an enlarged rear portion 26 proximate the shaft. Although the shaft and the rear portion have the same general shape, the rear portion is larger in lateral cross-section than the shaft. As such, a shoulder 28 is defined by that portion of the front surface of the enlarged rear portion that extends outwardly beyond the shaft. Preferably, the shoulder extends outwardly about the entire circumference of the shaft to form a shoulder having a relatively uniform width.

According to the present invention, that portion of the shaft 24 proximate the enlarged rear portion 26 includes curved corners. As such, the shoulder 28 defined by the ferrule also has curved interior corners 28a. As shown in FIG. 3, the ferrule 20 of the present invention does not have a generally cylindrical shaft. Instead, the shaft includes at least one planar edge extending between a pair of the curved corners. Planar is meant to include surfaces that are not strictly planar, linear, or flat, but are generally more flat that rounded. Most commonly, the shaft has a substantially rectangular shape in lateral cross-section. In this regard, the shaft of the ferrule depicted in FIG. 3 is considered to have a substantially rectangular shape even though the corners of the shaft are curved since the shaft includes linear edges extending between pairs of the curved corners. As such, the ferrule of the present invention can be an MT-compatible ferrule.

The corners of that portion of the shaft 24 proximate the enlarged rear portion 26 can be curved in several different manners. For example, the curved corners of one advantageous embodiment are semicircular in shape, while the curved corners of another embodiment are elliptical in shape. In the embodiment in which the curved corners are semicircular in shape, the curved corners typically define an interior angle of 90°. In the illustrated embodiment in which the curved corners are semicircular in shape, the semicircular corners can have various sizes depending upon the relative size of the ferrule 20 and the amount of float desired for the ferrule within the internal cavity defined by the connector housing. In this regard, any increase in the radius of the curved corners correspondingly increases the size of the shoulder 28 defined by the ferrule that helps to insure that the ferrule remains in position within the connector housing, but does disadvantageously reduce the float of the ferrule within the internal cavity defined by the connector housing. In one embodiment in which a generally rectangular shaft is sized to be about 4.4 millimeters by 2.5 millimeters, the curved corners preferably have a radius of about 0.8 millimeter. It should be noted that the radius on the curved corners of MT ferrules is typically 0.25 mm due to the mold and molding process. The curved corners of the present invention are intended to be larger that the default or inherent curves of the standard ferrules.

By including curved corners 28a, the ferrule 20 of the present invention has a larger shoulder 28, especially at the curved corners 28a, than conventional ferrules of the same general shape and size that do not have a shaft with curved corners. For example, in the embodiment in which a ferrule has a shaft 24 that is sized to be about 4.4 millimeters by 2.5 millimeters and that includes curved corners having a radius of about 1 millimeter, the resulting ferrule has a shoulder that has a surface area that is about 20% greater than a conventional ferrule of the same general shape and size that does not have a shaft with curved corners.

Although not necessary for the practice of the present invention, the enlarged rear portion 26 can also include curved corners such that the outer corners 28b of the shoulder 28 are also curved. As shown in FIG. 3, the curved corners of both the shaft 24 and the enlarged rear portion 26 are typically semicircular in shape. However, the semicircular corners of the enlarged rear portion typically define a smaller radius than the semicircular corners of the shaft. For example, in the above described embodiment in which the shaft is sized to be about 4.4 millimeters by 2.5 millimeters, the enlarged rear portion is typically sized to be about 5.05 millimeters by 3 millimeters. While the rear portion is larger than the shaft, the radius of the semicircular corners of the enlarged rear portion of one embodiment is about 0.3 millimeters in comparison with a radius of about 1 millimeter of the semicircular corners of the shaft. However, as shown in FIGS. 9–13, the ferrule can be sized differently and the corners of the shaft and/or the enlarged rear portion can have different shapes and sizes, if so desired. By reducing the amount of shaft 24 relative to the enlarged rear portion 26, more shoulder 28 is available to engage the corresponding shoulder of the connector housing 30. In fact, by rounding the corners of the shaft 24, or changing the shapes of the shafts 24 as shown in FIGS. 9–13, the relative area of the shoulder 28 to the area of the front face 23 of ferrule 20 is increased. Applicants have found that a ratio of shoulder area to the cross-sectional area in the proximity of the enlarged rear portion 26 (or the area of the front face 23 if the shaft 22 is not tapered) of greater than 42% is preferred. Normally, the ratio is between 34 and 39%, depending on whether the ferrule is the small (5.05×3 mm) or the large (7×3 mm) MT ferrule. The enlarged rear portion 26 of ferrules must stay relatively constant to fit within the standard MTP connectors. If the enlarged rear portion 26 were increased to provide a larger shoulder, the ferrule would not fit within the standard connectors. Similarly, if the cross-section of the shaft 24 of the ferrule were reduced too much, then there would be insufficient space for the bores 24 and guide pin bores 25.

As described above, the corners of that portion of the shaft 24 proximate the enlarged rear portion 26 of the ferrule 20 can be curved to increase the size of the shoulder 28 such that the shoulder remains engaged with an inwardly projecting shoulder defined by a connector housing. Instead of or in addition to designing the ferrule to have a shaft with curved corners, a fiber optic connector housing 30 is also provided according to the present invention that includes an inwardly projecting shoulder 32 of increased surface area relative to the inwardly projecting shoulders defined by conventional connector housings of the same shape and size. As such, the larger shoulder of the connector housing of this advantageous embodiment of the present invention also serves to maintain contact and engagement with the shoulder 28 of the ferrule 20 in order to prevent the ferrule from becoming dislodged within the connector housing and assuming a cocked position.

Figure 4:
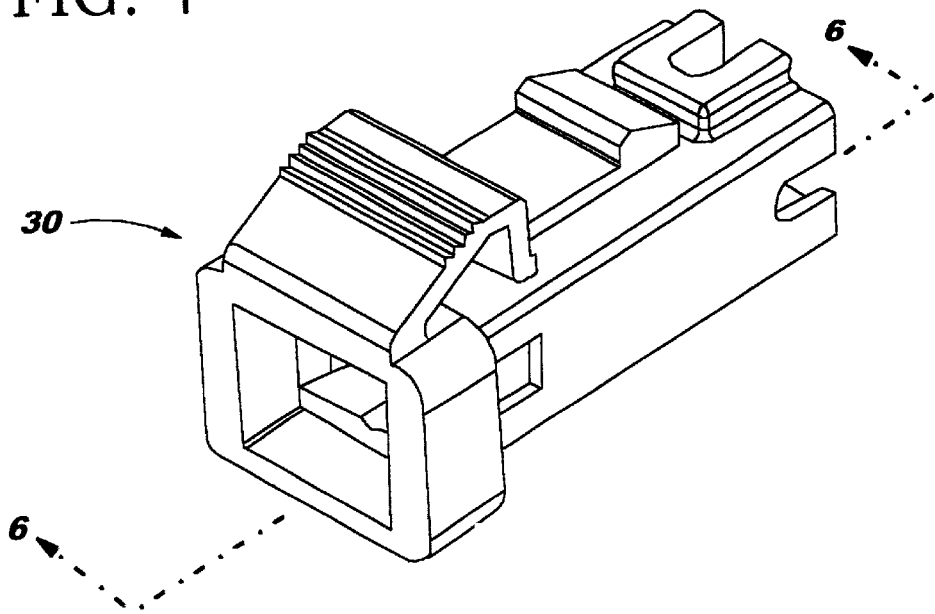
FIG. 4 is a perspective view of a fiber optic connector housing according to one embodiment of the present invention.
Figure 6:
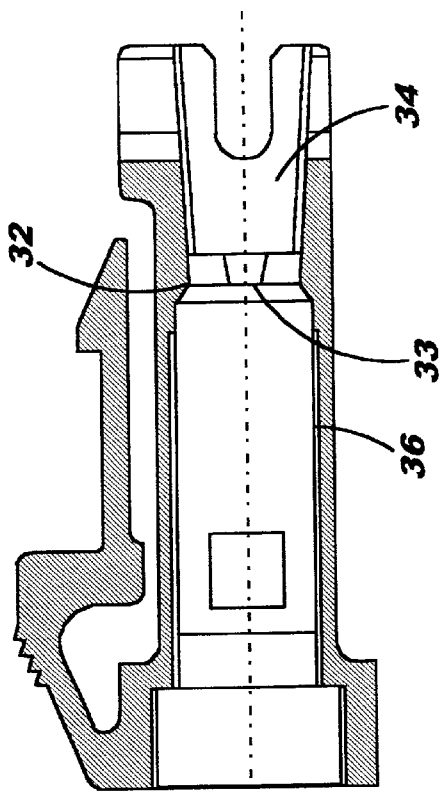
FIG. 6 a cross-section of the fiber optic connector housing of FIG. 4 taken along line 6—6.
Figure 5:
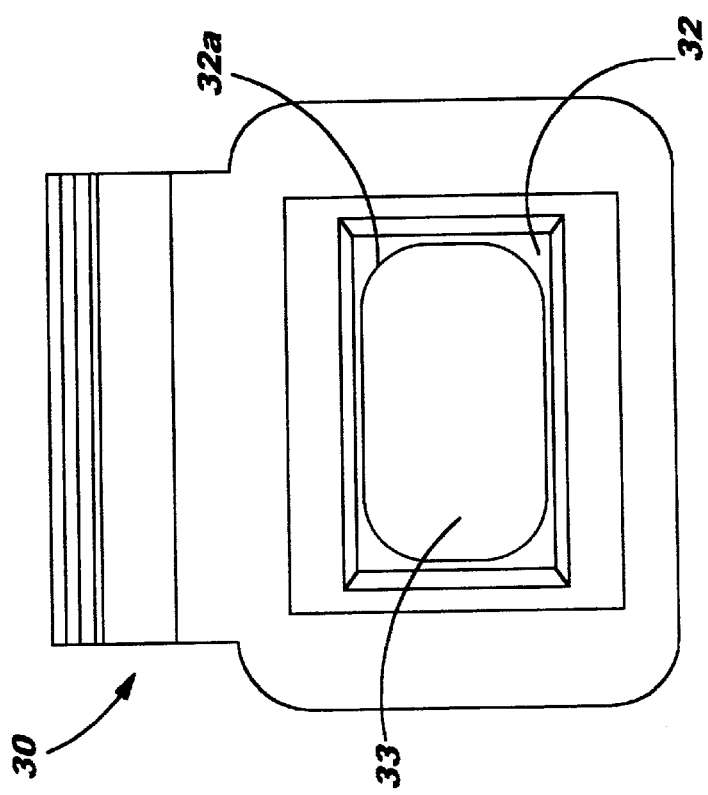
FIG. 5 is a schematic view of the rear end of the fiber optic connector housing of FIG. 4 depicting the curved corners of the inwardly projecting shoulder.

As shown in FIGS. 5 and 6, the connector housing 30 (generally shown in FIG. 4) of this embodiment includes a forward segment 34 defining a lengthwise extending passage and a rearward segment 36 that also defines a lengthwise extending passage. The lengthwise extending passages defined by the forward and rearward segments are in communication. However, the lengthwise extending passage defined by the rearward segment is larger in lateral cross-section than the lengthwise extending passage defined by the forward segment. As such, a projecting shoulder 32 is defined therebetween as shown in FIGS. 5 and 6. During the process of assembling the fiber optic connector, a ferrule 20 is therefore inserted through the rear end of the connector housing and into the lengthwise extending passage defined by the rearward segment and is advanced forwardly therethrough until the shoulder 28 of the ferrule engages the projecting shoulder 32 of the connector housing 30. Once the respective shoulders have engaged, the shaft 22 of the ferrule generally extends lengthwise through the passage defined by the forward segment while the enlarged rear portion 24 of the ferrule remains within the passage defined by the rearward segment of the housing.

According to the present invention, that portion of the forward segment 34 of the connector housing 30 proximate the rearward segment 36 defines a section of the lengthwise extending passage having curved corners such that the inwardly projecting shoulder 32 has curved corners 32a. As described above in conjunction with the ferrule 20 of the present invention, the lengthwise extending passage of the forward segment of the connector housing is not cylindrical. Instead, the lengthwise extending passage defined by the forward segment includes at least one linear edge extending between a pair of curved corners. More commonly, the lengthwise extending passages defined by both the forward segment and the rearward segment of the connector housing of the present invention are of a generally rectangular shape in lateral cross-section. As such, the connector housing of this embodiment of the present invention can be compatible with an MT fiber optic connector.

Much like the curved corners of the shaft 24 of the ferrule 20 of another embodiment of the present invention, the curved corners of that portion of the forward segment 34 of the connector housing 30 proximate the rearward segment 36 can have various shapes, such as a semicircular shape or an elliptical shape. In embodiments in which the curved corners of the connector housing are semicircular in shape, the semicircular corners preferably define an interior angle of about 90°. In addition, the radius of the semicircular corners of the forward segment of the connector housing can be sized differently depending upon the respective sizes of the forward segment and the rearward segment. In one embodiment in which the opening 33 through projecting shoulder 32 is about 4.8×2.8, and the rearward segment 36 is about 5.1 millimeters×3.1 millimeters to accommodate the shoulder 28 of ferrule 20, the semicircular corners of the projecting shoulder 32 preferably have a radius of between about 0.5 millimeters and about 0.7 millimeters.

Additionally, while the lengthwise extending passage defined by the forward segment 34 can have the same shape and size throughout its length, at least a portion of the passage can be tapered or chamfered somewhat, if so desired, as shown in FIG. 6. In this regard, the medial and forward sections of the lengthwise extending passage defined by the forward segment, i.e., all portions of the passage defined by the forward segment other than those portions proximate the rearward segment, can be tapered outwardly in a direction extending lengthwise from the rear end toward the forward end of the connector housing in order to facilitate floating of the ferrule 20 within the internal cavity defined by the connector housing 30.

As described above in conjunction with the ferrule 20 of another advantageous embodiment of the present invention, the curved corners 32a of the shoulder 32 defined by the connector housing 30 of this embodiment of the present invention increase the surface area of the shoulder relative to a conventional connector housing. As such, the connector housing of the present invention can maintain engagement with the shoulder 28 of the ferrule 20 and can prevent the ferrule from becoming cocked within the connector housing even as the ferrule is positioned at extreme lateral positions within the internal cavity and as the ferrule is subjected to off-axis forces.

As described above, the ferrule 20 and the connector housing 30 therefore define respective shoulders having curved corners that effectively increase the surface area of the respective shoulders. As such, the shoulders of the ferrule and the connector housing can maintain engagement even as the ferrule floats within the internal cavity defined by the connector housing, thereby preventing the ferrule from becoming cocked or otherwise misaligned within the internal cavity defined by the connector housing. As a result of the increased surface area of the shoulder 28, the ferrule of the present invention will be seated more securely within the internal cavity defined by either the connector housing of the present invention or a conventional connector housing of the same general shape and size. Likewise, the connector housing of the present invention will retain the ferrule in position within the internal cavity defined by the connector housing even as the ferrule floats irrespective of whether the ferrule has a shoulder with curved corners according to the present invention or whether the ferrule is of a conventional shape and size.

Figure 7:
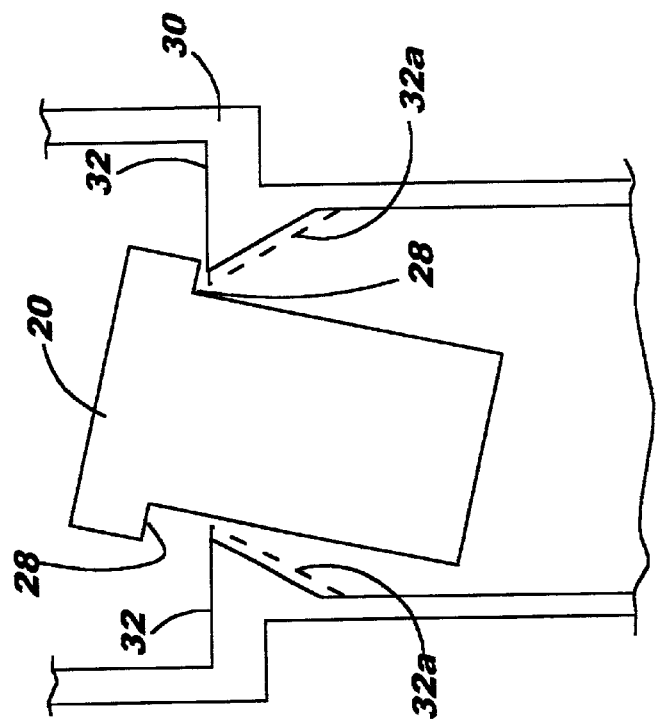
FIGS. 7 and 8 are schematic views illustrating the engagement of the shoulders of a ferrule and a fiber optic connector housing according to one embodiment of the present invention as the ferrule floats within the internal cavity defined by the fiber optic connector housing.
Figure 8:
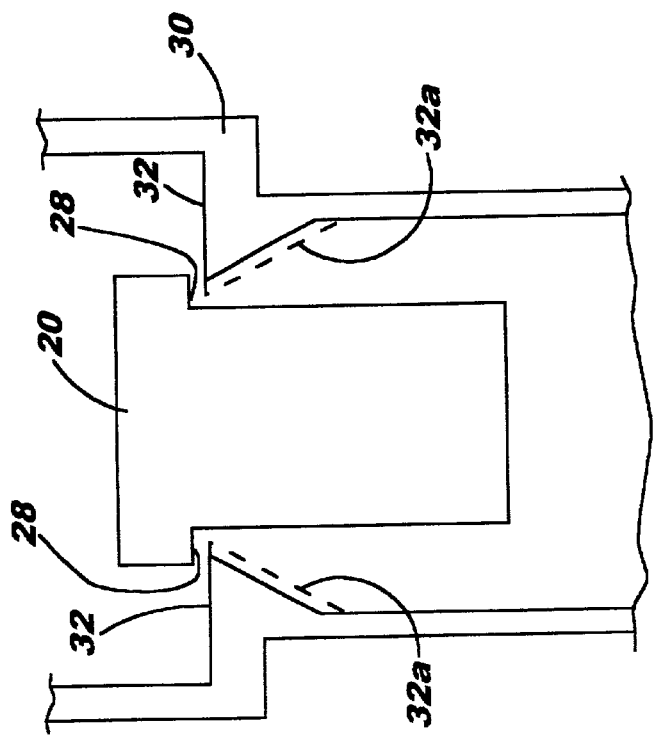
Figure 9:
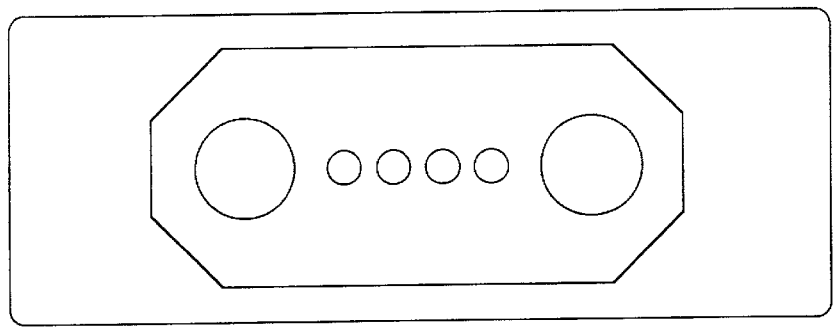
FIGS. 9 and 13 are plan view of the front end of different embodiments of a ferrule according to the present invention.
Figure 10:
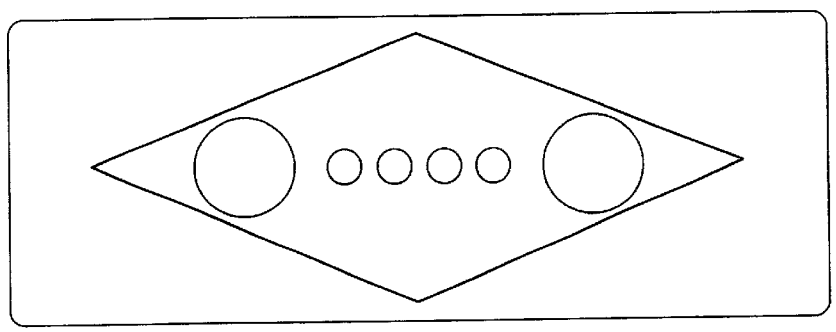
Figure 11:
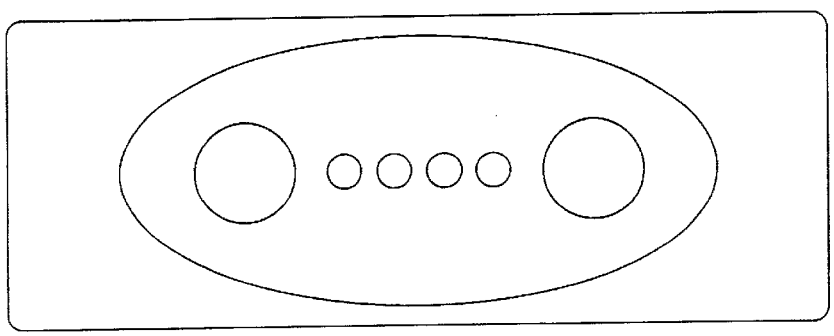
Figure 12:
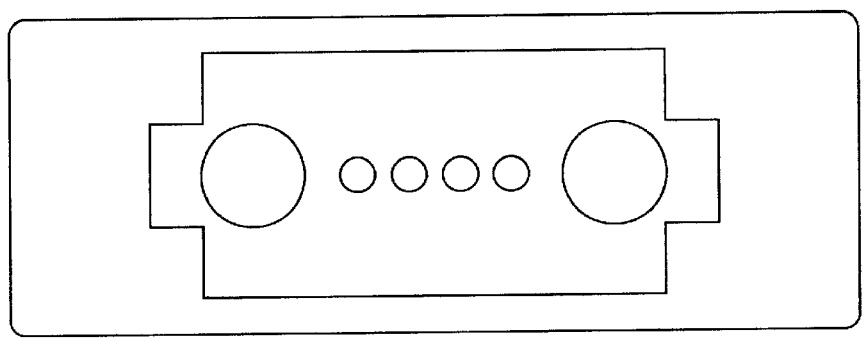
Figure 13:
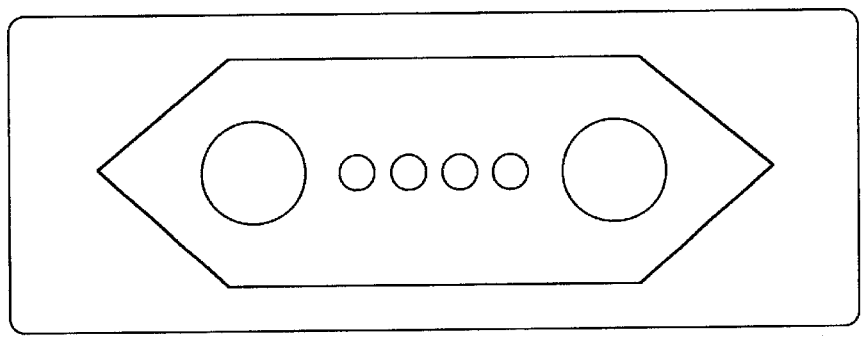

By way of example, FIGS. 7 and 8 depict the engagement of the shoulders of the ferrule 20 and the connector housing 30. In this regard, the additional surface area provided by the curved corners 32a of the shoulder 32 of the connector housing is outlined in dashed lines. In instances in which the ferrule is centered within the internal cavity defined the connector housing, the minor sides of the ferrule shoulder 28 are both engaged by the connector housing shoulder as shown in FIG. 7. In instances in which the ferrule is subjected to off-axis forces as shown in FIG. 8, the minor sides of the ferrule shoulder maintain engagement with the connector housing shoulder, albeit with the curved corners of the connector housing shoulder. As such, the ferrule does not become dislodged from the connector housing shoulder and the ferrule is prevented from being cocked within the internal cavity defined by the connector housing as depicted in FIG. 8 for a conventional ferrule and connector housing.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A ferrule comprising:
    a lengthwise extending shaft; and
    an enlarged rear portion proximate said shaft, said rear portion being larger in lateral cross-section than said shaft to thereby define a shoulder,
    wherein that portion of said shaft proximate said enlarged rear portion comprises curved corners and at least one planar edge extending between a pair of the curved corners.

2. The ferrule according to claim 1 wherein the curved corners are semicircular in shape.

3. The ferrule according to claim 2 wherein the semicircular corners define an interior angle of 90°.

4. The ferrule according to claim 2 wherein the semicircular corners have a radius of about 0.8 millimeter.

5. The ferrule according to claim 1 wherein said shaft defines a plurality of optical fiber bores to thereby form a multifiber ferrule.

6. The ferrule according to claim 5 wherein said shaft has a substantially rectangular shape in lateral cross-section.

7. The ferrule according to claim 1 wherein said enlarged rear portion also comprises curved corners.

8. The ferrule according to claim 7 wherein the curved corners of both said shaft and said enlarged rear portion are semicircular in shape.

9. The ferrule according to claim 8 wherein the semicircular corners of said enlarged rear portion define a smaller radius than the semicircular corners of said shaft.

10. A ferrule comprising:
    a lengthwise extending shaft having a substantially rectangular shape in lateral cross-section; and
    an enlarged rear portion proximate said shaft, said rear portion being larger in lateral cross-section than said shaft to thereby define a shoulder,
    wherein that portion of said shaft proximate said enlarged rear portion comprises curved corners.

11. The ferrule according to claim 10 wherein the curved corners are semicircular in shape.

12. The ferrule according to claim 11 wherein the semicircular corners define an interior angle of 90°.

13. The ferrule according to claim 11 wherein the semicircular corners have a radius of about 0.8 millimeter.

14. The ferrule according to claim 10 wherein said shaft defines a plurality of optical fiber bores to thereby form a multifiber ferrule.

15. The ferrule according to claim 10 wherein said enlarged rear portion also comprises curved corners.

16. The ferrule according to claim 15 wherein the curved corners of both said shaft and said enlarged rear portion are semicircular in shape.

17. The ferrule according to claim 16 wherein the semicircular corners of said enlarged rear portion define a smaller radius than the semicircular corners of said shaft.

18. A ferrule comprising:

a lengthwise extending shaft having a cross-sectional area; and an enlarged rear portion proximate said shaft, said rear portion being larger in lateral cross-section than said shaft to thereby define a shoulder having an area, wherein the area of the shoulder is at least 42% of the cross-sectional area of the shaft.

19. The ferrule according to claim 18 wherein the shaft has a substantially rectangular shape.

20. The ferrule according to claim 18 wherein the shaft has an oval shape.

21. The ferrule according to claim 18 wherein the shaft has a diamond shape.

22. The ferrule according to claim 18 wherein the shaft has an octagonal shape.

23. The ferrule according to claim 18 wherein the shaft has an hexagonal shape.

* * * * *